June 13, 1967 A. SLUTSKY 3,325,097
TAXI METERS AND A CONTROL SYSTEM FOR TAXI METERS
Filed Oct. 22, 1965 2 Sheets-Sheet 1
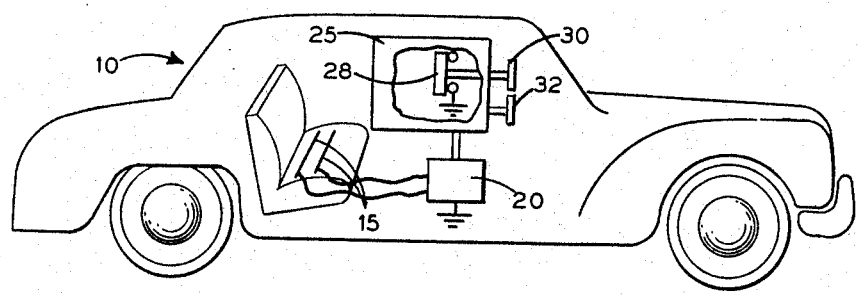
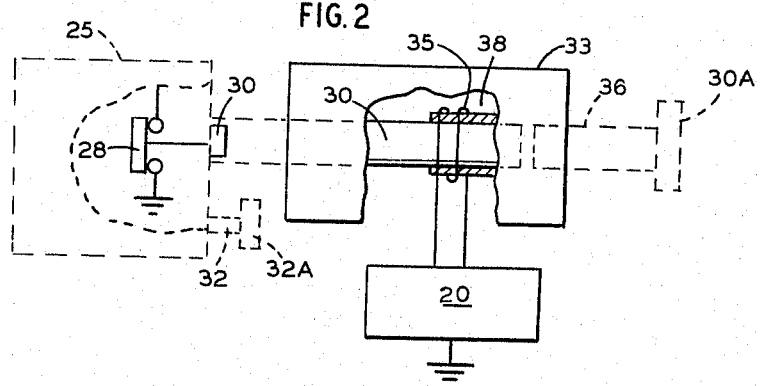
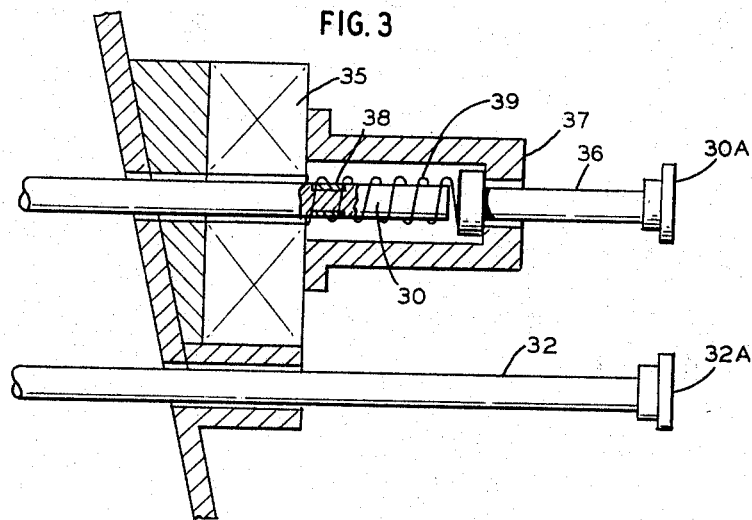
INVENTOR.
Abraham Slutsky
BY
ATTORNEY INVENTOR.
Abraham Slutsky
BY

United States Patent Office 3,325,097
Patented June 13, 1967

3,325,097
TAXI METERS AND A CONTROL SYSTEM FOR TAXI METERS
Abraham Slutsky, 41—43 39th Place,
Long Island City, N.Y. 11104
Filed Oct. 22, 1965, Ser. No. 501,633
7 Claims. (Cl. 235—30)

This invention relates to a control system for taxi meters, to assure that the taxi meter which registers the fare will be caused to operate and start operating for counting time or for measuring the fare, according to the design of the meter, within a short time after a passenger enters the taxi and seats himself. The control system may also be utilized to incapacitate a vehicle from further operation, if the fare register has not been set within a predetermined time after seating of the passenger or passengers. The invention also relates to a modified taxi meter.

One of the problems encountered by the owners of taxi fleets is the failure or delay on the part of the taxi driver to operate the fare register, or meter, when a passenger enters the taxi, or sufficiently soon after a passenger enters the taxi, to enable the register to compute the proper fare due from the passenger.

One object of this invention is to provide a control system which will supervise the operation of a taxi meter, or fare register, in such manner as to permit the driver of the taxi to initiate operation of the fare register for a proper fare measurement within a reasonable time after the passenger enters the taxi, or, in the alternative, to automatically operate the fare registering mechanism to measuring position if the driver of the taxi vehicle fails to do so within a predetermined, reasonable time after a passenger has seated himself in the vehicle and the vehicle has started to move on its journey.

Another object of the invention is to modify and supplement the construction and operation of a present conventional taxi meter by the application of a simple adapter externally of the meter housing, without interfering with the normal construction and operation of the internal mechanism of the meter.

In order to determine when the passenger enters the vehicle, a suitable two-wire switching cable is disposed under the seats that will be available for seating a passenger, and under a floor pad upon which a passenger's feet will rest. That switching circuitry, at the seats, and on the floor of the taxi, serves to control a series of relays including suitable time delay functions for operating the taxi meter to proper fare registering position.

The function of the control system for the taxi meter is to assure that the meter is operated within a predetermined short interval of time after a passenger seats himself in the vehicle, to assure that the fare measuring operation will be commenced as soon as is proper. As an example, an interval of 20 to 30 seconds is assumed herein to be an adequate interval of time within which the taxi driver may receive his instructions and learn of the desired destination of his passenger. The control system herein is therefore operated during such predetermined time interval to permit the driver to set the taxi meter to fare registering position within that time interval himself, or, if he does not do so, to automatically set the taxi meter to fare registering position.

Some systems of this type have been suggested in the prior art. However, they have not been successful because they failed to take into consideration that a seat switch, normally held closed by a seated passenger, might open for a fraction of a second and disconnect the control system, in cases where the passenger would be bounced from his seat momentarily because of the taxi moving over a bump in the road.

One of the important features of the present invention is the provision of a solution to that problem by including a time delay function to prevent a disconnection in the sequential operation of the control system, which operation is intended to, and ultimately does, cause the operation of the taxi meter to its active position at which it measures and registers the fare due from the passenger.

Such time delay function, in the system disclosed herein, serves to hold the control system, at any instant, in continuous operating condition, in spite of the occurrence of a bounce that would open any of the seating switching circuits and that would otherwise deenergize the control system. Since the closing of a seat switch initiates operation of such a meter control system, opening of a seat switch would normally deenergize the control system and require such control system to start again from initial starting or rest position. Such time delay function is provided by a relay whose operation from normal open position to closed position, and from closed position back to normal open position, is set for a short interval, for example, about two seconds, which is sufficient to contain the normal short time transient interval during which a bounce may occur and complete itself by restoration of the seating switch and seating condition of the passenger back to normal.

The supervisory time interval for permitting proper operation of the taxi meter by the driver may be from 20 to 30 seconds, which is provided by a relay which may be suitably adjusted to provide that time interval only in its forward operation from open to closed position. Such a relay if not suitably controlled, could drop back or return to its open position immediately upon the occurrence of a bounce with accompanying opening of the seating switch, but by means of the time delay feature included herein, the long time delay relay operating for a period of from 20 to 30 seconds to reach its closed position, is prevented from restoring itself to its starting position unless the opening of the seating switch is due to a condition other than the transient one caused by a bounce of the vehicle over a bump.

The manner in which a taxi meter may be modified, and the manner in which the control system herein functions to control the operation of the taxi meter registering mechanism, is shown in more detail in the accompanying drawings, in which:

FIG. 1 is a schematic side view, in outline, of an automotive vehicle, equipped with a taxi meter of present conventional type;

FIG. 2 is a schematic view of the meter of FIG. 1, shown in dotted outline, as modified by an adapter, shown in solid line and applied thereto in accordance with the present invention;

FIG. 3 is a vertical sectional view of a portion of the meter of FIG. 2, showing the details of the adapter applied thereto, including an actuating solenoid and a lost-motion mechanical actuator.

Figure 4:
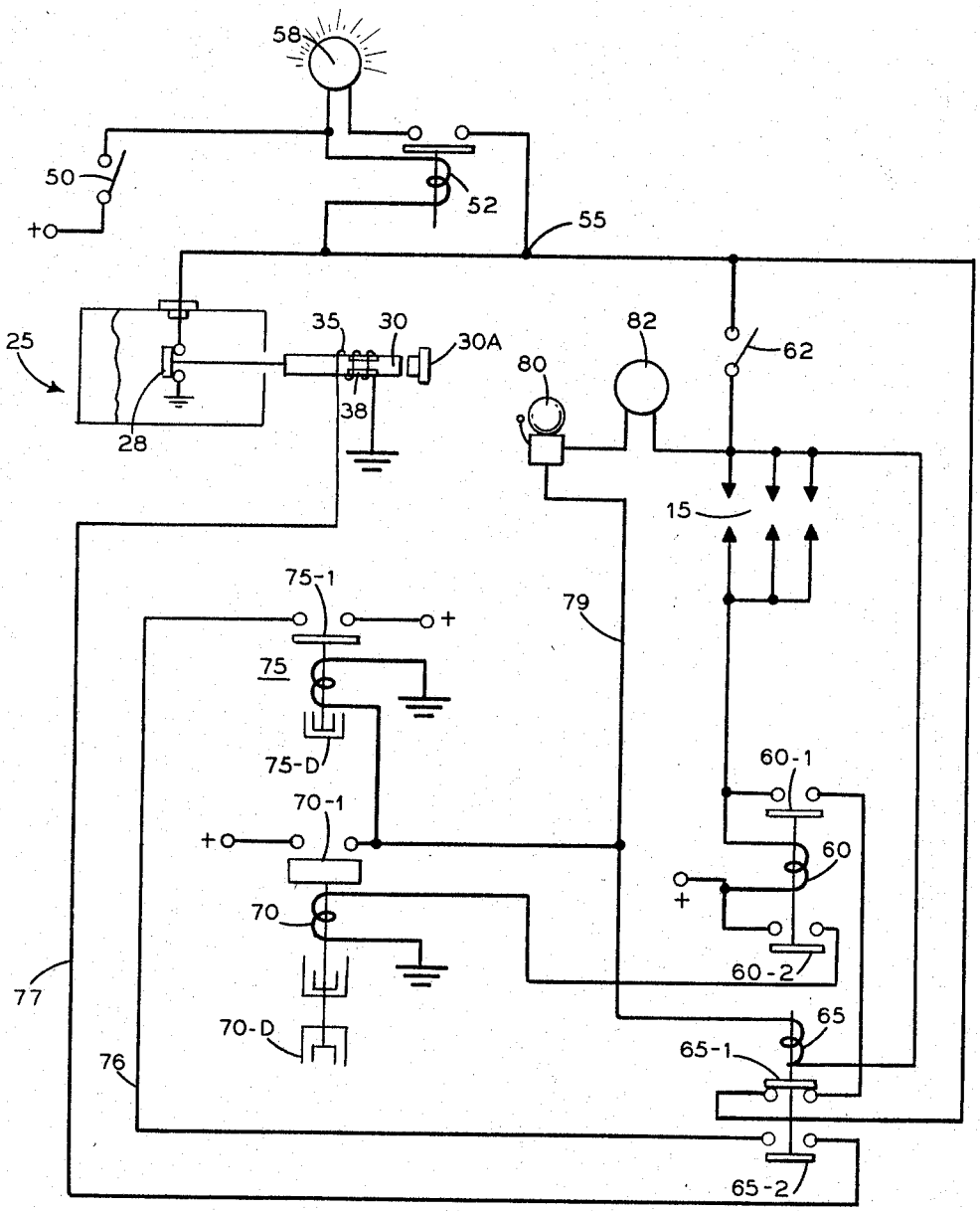
FIG. 4 is a circuit diagram of the control system of this invention.

As shown in FIGURE 1, an automobile taxi 10 is shown to indicate the field of application of the invention which is shown schematically, as applied to a taxi meter 25.

A switching circuit 15 is shown schematically, as disposed appropriately in and under the passenger seats of the vehicle 10, and supplies a short-circuiting signal indicating its condition, when actuated by a seating passenger, to a control box 20 which includes generally the control equipment of this invention. The equipment in the control box 20 is indicated to be electrically related to the taxi meter 25 which is to be controlled by the control equipment in the box 20. The taxi meter 25 is also shown schematically to include a control switch 28, shown as a grounding switch, which controls the energizing circuit for the equipment in the control box 20, so that operation of the taxi meter, either manually by the taxi driver, or automatically by the control equipment 20, will open the grounding switch 28 to disconnect the control equipment 20 from its energizing source to terminate the supervisory control of the control equipment in the box 20 with respect to the taxi meter 25.

It may be mentioned at this time that the taxi meter 25 is of a type presently commercially available and in use, and commercially known as the Halda Mark 8, a push-button taxi meter having two buttons 30A and 32A to operate two plungers 30 and 32. The top plunger 30 serves to control internal mechanism of the taxi meter for usual operations; the bottom plunger 32 serves to establish a reset operation of the taxi meter for rare occasions, when a passenger arriving at his destination decides instead to continue to another destination.

In the taxi meter 25 as now conventionally used, the main operating push bottom 30A operates a single plunger 30 as in FIG. 1. When a fare passenger enters the taxi, top push button is pressed to push plunger 30 inward. The taxi meter 25 is internally constructed so a first push of plunger 30 initiates operation and actuates the internal mechanism to connect the fare registering mechanism for fare-computing and indicating operation. The plunger button 30A is released and plunger 30 returns to initial position, ready for a second push inward.

When the destination is reached, top button 30A is pressed to push plunger 30 in again, which stops the time registering operation and leaves the fare indicator in position so it can be read by the passenger.

When the passenger leaves the taxi, the operator pushes top button 30A for plunger 30, a third time, which restores the meter 25 to initial or zero position, ready to commence a new reading for a subsequent passenger trip.

These operations of the taxi meter 25 are conventional and do not involve any part of the invention.

The present invention is to provide a system or circuit control whereby the push-button plunger 30 of the taxi meter 25 is operated automatically if and when the taxi driver fails to operate the push-button manually, under appropriate conditions, when a passenger has entered the taxi and his journey for pay is ready to commence.

One feature of the present invention requires the application of means shown herein as a solenoid for operating the internal mechanism associated with the push-button plunger 30 when conditions are proper to start the taxi meter in operation to compute the fare for the journey presently being commenced.

FIG. 2 shows schematically the application of the invention herein to modify the taxi meter 25. As there shown, the invention includes an adapter, represented by box 33, including a solenoid 35, shown in FIG. 3, to be energized through a control circuit contained in box 33, as shown in more detail in FIG. 4, described below.

FIG. 3 shows schematically the functional arrangement of the components of adapter 33, upon application to the operating plunger 30 of the taxi meter of conventional design, to obtain the advantages of this invention.

The original button 30A of operating plunger 30 of the conventional meter is replaced by a manual plunger 36 supported to be slideable in a supporting bearing sleeve 37, to push plunger 30 inward to actuate the internal mechanism of the meter. A solenoid 35 is positioned and supported at rest against the meter case, to push plunger 30 inward by magnetically acting on a magnetizable sleeve 38 secured to plunger 30, to serve as a magnetic core for the solenoid when it is energized. A compression return spring 39 is disposed with one end braced against an enlarged end 36A at the inner end of manual plunger 36, and the other end of the spring 39 is braced against the side face of the solenoid, to return the manual plunger 36 and button 30A to normal outermost position, ready for a subsequent operation, after the solenoid 35 is de- energized at the end of an operation, to enable the plunger 30 to be restored to outermost position. A suitable support 40 holds the solenoid 35 in proper operative position.

The energization of the solenoid 35 is controlled by a system of relays and circuitry, as shown in FIG. 4.

When the taxi vehicle is not operating and is standing still, the ignition switch will normally be off, or open. When the ignition switch is closed by the operator, it will close a circuit from positive battery terminal through ignition switch 50, the solenoid of a relay switch 52, to a grounding bus 55, which is normally grounded by a normally-closed switch 28 of the fare register when the register is at rest and not operating. Relay switch 52 is thereupon closed to connect the dome light 58 between the positive terminal of the ignition switch 50 and the grounding bus 55, which lights up the dome light, while ignition switch 50 is closed and the fare register is not set to operating position.

When a passenger enters the vehicle and seats himself, the switching circuitry 15, disposed under all of the passenger seats of the vehicle, will close the circuit at the particular switch area of the passenger and will thereupon complete an energizing circuit from the positive battery terminal through the coil of a relay switch 60, through the seating switch 15 and a normally closed test switch 62, to the ground bus 55 and through the grounding switch 28 in the fare register. The switch 62 serves merely to provide a simple circuit opening device for testing the circuitry during maintenance operations.

The relay switch 60, when thus energized, closes two front contact switches 60–1 and 60–2. Switch 60–1 provides a by-pass or holding circuit that by-passes the seating switch 15, to be operative for a short interval, for example 2 seconds, as will be shortly explained. Thus, the holding circuit for the relay switch 60 is completed from the positive battery terminal through the solenoid of switch 60, through upper switch 60–1 and then through a back contact switch 65–1 of a relay switch 65, and thence back to the grounding bus 55 and through the switch 28 of the fare register, to ground.

The relay switch 65 is normally deenergized and will remain so for the first two seconds after the passenger seat switch is closed. Consequently, its back switch 65–1 remains closed for that two second period.

In the meantime, when relay switch 60 was energized, and closed its bottom switch 60–2, the closing of that switch completed a circuit to operate a two second time delay relay 70, by a circuit from a positive terminal of the battery through the relay switch 60–2 and through the operating solenoid of the time delay switch 70 to ground.

The relay 70 is shown schematically as being provided with a dashpot merely to indicate that its operation involves a time interval. Actually, a thermal relay has been used and found satisfactory for the operation to provide two second delay in closing and two second delay in opening. A double dashpot 70–D is shown to indicate that the two second time delay operates in both directions, that is, two seconds are required in the operation of the relay to close its front switch 70–1, and similarly, two seconds are required to open that switch 70–1.

When relay switch 70 operates for two seconds and closes its front switch 70–1, that switch 70–1 closes and energizes a circuit to the solenoid of a second time delay relay switch 75, which is shown provided with a dashpot 75–D to operate for an interval of 20 to 30 seconds, depending upon its setting, before closing its front switch 75–1. Here, also, a thermal relay has been used and is highly suitable.

The function of switch 75–1 is to automatically operate the fare register plunger 30 to start operation of the fare register meter 25. The closure of switch 75–1 completes the circuit from the positive terminal of the battery through conductor 76 and bottom front contact switch 65-2 of relay switch 65, through conductor 77 and the operating solenoid 35, applied to the fare register meter to ground, thereby energizing the solenoid 35 to actuate the plunger 30 to operate the mechanism for placing the fare register into computing and registering condition.

It will be observed that the time schedule or delay of the relay 75, as determined by its adjustable setting which may be from 20 to 30 seconds, plus the two seconds of the relay 70, will determine the amount of time available to the driver of the taxi vehicle before the meter is operated automatically to fare computing and registering condition.

As a prior courtesy warning, the closure of the two second relay switch 70-1 will also energize a warning circuit from the positive terminal of the battery through switch 70-1 and through conductor 79 to a bell 80 and signal light 82 and through the testing switch 62 to the ground bus 55 and the grounding switch 28 in the meter.

This two second relay 70 prevents any interruption of the operation of the relay 75 that might otherwise be caused by any transient reopening of the seating switch 15 due to bouncing of the passenger when the vehicle passes over a bump in the road. The provision of this time delay feature thus assures that the relay 75 will continue in operation after its energization has been started, subject to interruption only if the driver pushes manual plunger 30 in before the solenoid 35 is energized.

Thus, by the provision of the adapter to the taxi meter and the control circuitry for the solenoid, appropriate operation of the taxi meter is assured. The invention is not limited specifically to the details illustrated, since they may be modified without departing from the spirit and the scope of the claims. For example, the control system disclosed herein is not limited to control of the meter. The solenoid shown here, as applied to the meter, may be employed, instead, to operate any suitable means to incapacitate the taxi vehicle from further motion. Thus the solenoid could be made to operate a switch to ground the ignition system to prevent further operation of the ignition system; or the solenoid could be made to operate on an element to apply the brake system of the vehicle.

What is claimed is:

1. A taxi meter control system, comprising:
a fare register meter having a first push button to initiate operation of the meter;
a seat switch system to be distributed among the several seats of a taxi, in which said meter is to be disposed, for use to close a circuit at said switch when a passenger sits on any one of said several seats;
a short-time-delay relay having a switch and requiring a short time interval of about two seconds to move said switch from open to closed position or from closed to open position;
a long-time-delay relay having a switch and requiring a long interval of about thirty seconds to operate said switch from open position to closed position or from closed position to open position;
means responsive to a closed circuit condition in the seat switch system for initiating operation of said short-time-delay relay;
means responsive to closing operation of said short-time-delay relay for initiating operation of said long-time-delay relay;
and means responsive to closing operation of said long-time-delay relay for causing operation of said first push button to initiate operation of said register meter.

2. A taxi meter control system, as in claim 1, including further,
a relay switch that is operable by the seat switch system, and serves, in turn, to energize the short-time-delay relay, said relay switch including an auxiliary switch for controlling a self-holding circuit to bridge the seating switch.

3. A taxi meter control system, comprising:
a taxi meter having a fare register mechanism, with means for automatically initiating operation of the fare register and for terminating operation of the fare register independently of the driver, said means including both a manually-operable means and an electrically-operable means;
meter switch means normally in closed position within the meter and operable by said operation-initiating means to open position;
and means operable by said operation-initiating and terminating means for restoring said switch means to its normal closed position;
means for actuating said operation-initiating means of said fare register;
seat switch means for disposition at each seat of such taxi vehicle to respond to seating of a passenger on such seat;
and means responsive to said seat switch means for controlling the operation of said actuating means.

4. A taxi meter control system, as in claim 3, in which
said actuating means responsive to said seat switch means including time-delay means for delaying automatic actuation of said operation-initiating means of said fare register for a predetermined time after a passenger seat switch is closed by seating of a passenger;
and said time-delay means includes a first time-delay relay switch having a short time delay action of about two seconds in each direction, both in moving to closing position and subsequently in moving back to open position, and includes a second time-delay relay switch having a longer time delay action of about twenty to thirty seconds at least in moving to closing position;
said first time-delay relay switch serving in closed position to complete a circuit including means for effecting operation of said second time-delay relay switch;
and a circuit controlled by said second time-delay relay switch when in closed position, said controlled circuit including means for directly actuating said operation-initiating means of said fare register.

5. A taxi meter control system for a passenger taxi, comprising:
fare registering means;
electrically-operable means for initiating operation of said fare registering means;
seat switch means operable to closed position by a passenger sitting on a seat for controlling the energization of said electrically-operable means;
time-delay means for introducing a predetermined measured time interval between the instant of closing of said seat switch means and the energization of said electrically-operable means;
and means for delaying an opening of said seat switch means from affecting said electrically-operable means, to thereby selectively isolate a transient opening of said seat switch means and prevent such transient opening from affecting said electrically-operable means.

6. A taxi meter comprising:
fare registering means and internal operating mechanism therefor;
a casing for enclosing said fare registering means;
a plunger extending through a wall of said casing for controlling the actuation and positioning of said internal operating mechanism for said fare registering means;
a solenoid for actuating said plunger when said solenoid is energized;
and switch means disposed within the casing and controlled by an operation of said internal operating mechanism for controlling the circuit of said solenoid.

7. A meter and fare register for a taxi vehicle, comprising counting and fare registering mechanism and an indicator therefor;

a housing for said mechanism and indicator;

internal means within the housing for connecting said mechanism and indicator to an internal actuating means that will be driven by a taxi vehicle onto which the meter and fare register are mounted;

manually-operable means to be operated by the driver of the taxi vehicle for operating said internal means for rendering said meter and fare register operative;

and electrical means operable independently of said manually operable means for operating said internal connecting means;

said manually-operable means including a plunger for operating said internal means to render said meter and fare register operative;

a pressure button operable by the driver of the vehicle to push said plunger inwardly to operate said internal means;

and spring means to bias said button to disengage said plunger;

and said electrical means when energized tends to act upon said plunger independently of said pressure button.

References Cited

UNITED STATES PATENTS

| | | | |
|---|---|---|---|
| 1,850,741 | 3/1932 | Brownell | 235—30 |
| 1,873,539 | 8/1932 | Brownell | 235—30 |
| 2,598,348 | 5/1952 | Butler | 235—30 |
| 2,815,911 | 12/1957 | McMullin | 235—30 |
| 3,111,185 | 11/1963 | Butler | 235—30 |

RICHARD B. WILKINSON, *Primary Examiner.*

STEPHEN J. TOMSKY, S. A. WAL, *Assistant Examiners.*